United States Patent [19]

Skelley et al.

[11] Patent Number: 4,999,167
[45] Date of Patent: Mar. 12, 1991

[54] LOW TEMPERATURE $NO_x/SO_x$ REMOVAL APPARATUS

[76] Inventors: Arthur P. Skelley, 2440 Bellwood Dr., Pittsburgh, Pa. 15237; James C. McMichael, 1126 Harvard Rd., Monroeville, Pa. 15146

[21] Appl. No.: 369,249
[22] Filed: Jun. 20, 1989
[51] Int. Cl.⁵ .................. C10K 1/08; C10K 1/34
[52] U.S. Cl. .................. 422/175; 55/222; 55/DIG. 30; 110/215; 261/138; 261/149; 261/DIG. 9; 422/172; 422/173
[58] Field of Search .............. 422/172, 173, 175; 55/222, DIG. 30; 110/215; 261/138, 149, DIG. 9

[56] References Cited

U.S. PATENT DOCUMENTS

| | | | |
|---|---|---|---|
| 3,473,298 | 10/1969 | Berman | 55/222 |
| 3,775,948 | 12/1973 | Beam | 55/238 |
| 3,881,004 | 4/1975 | Kelly et al. | 423/235 |
| 3,960,992 | 6/1976 | Cyrenne | 261/152 |
| 4,121,541 | 10/1978 | Kneissl et al. | 122/1 R |
| 4,681,744 | 7/1987 | Weitman | 422/173 |
| 4,784,835 | 11/1988 | Fritz | 422/173 |
| 4,799,941 | 1/1989 | Westermark | 55/90 |

OTHER PUBLICATIONS

Perry & Chilton, Chemical Engineers' Handbook, 5th Edition, pp. 12-5 through 11-8 and 18-82 through 18-85.
"$NO_x$ Emissions Plummeted Far Below Minimum EPA Standards With No Increase in Fuel Needs" by H. Dain Kelly, Charles Block and Karen L. Kuncl; *Chemical Processing*, Jan. 1977, pp. 22-24.

Primary Examiner—Robert J. Warden
Assistant Examiner—Jill Johnston
Attorney, Agent, or Firm—Nils H. Ljungman & Associates

[57] ABSTRACT

Exhaust gases from a process fired boiler are diverted from a stack prior to emission to the atmosphere through a duct system to a plurality of series connected heat exchangers. The exhaust gases are progressively reduced from an elevated temperature, for example in the range between about 350°-525° F, in stages to an ambient temperature of about 50° F. At each stage heat from the exhaust gases is transferred from the gases to another medium, such as water, which is fed back to the boiler to reduce the energy cost of operating the boiler. At ambient temperature the exhaust gases are subjected to an atomized spray of a reagent solution that absorbs the contaminants in the exhaust gases. Absorption of the contaminants into solution with the atomized reagent spray is promoted by contact of the spray and exhaust gases on the surface of a fibrous batting. With the exhaust gases at ambient temperature the percentage of contaminants in the flue gas that enters into solution with the reagent is substantially increased. Thus the reagent absorbs the contaminants, and the exhaust gases are emitted after further moisture separation substantially free of contaminants.

9 Claims, 2 Drawing Sheets

LOW TEMPERATURE NO$_x$/SO$_x$ REMOVAL APPARATUS

BACKGROUND OF THE INVENTION

1. Field of the Invention

This invention relates to apparatus for separating contaminants from the exhaust gases for emission of contaminant-free exhaust gases to the air, by lowering and controlling the exhaust gases to the required ambient temperature to facilitate removal of the contaminants while recovering useful heat.

2. Description of the Prior Art

Flue gas recovery devices are well known and, in particular devices associated with power generation plants and coal, oil or gas-fired boilers for removing from the flue gas stream NO$_x$ and SO$_x$ emissions. An example of conventional devices that not only recover heat from flue gas but also remove the contaminants is disclosed in U.S. Pat. No. 4,121,541 where a flue gas from a power generating plant is purified and heat is recovered from the flue gas. The flue gas from the boiler initially enters a heat exchanger where it is cooled and thereafter contacted with cooling water to remove waste heat. Pollutants contained in the flue gas are partially absorbed by cooling water. Thereafter the purified flue gas is released with ambient cooling air into the surrounding atmosphere. This system is characteristic of a wet flue gas scrubber used to remove contaminants in the form of sulfur dioxide, fluorine compounds, nitrogen oxides, etc.

Other known devices for removing contaminants from exhaust gases emitted from power plants are disclosed in U.S. Pat. Nos. 3,473,298 and 4,799,941. With these devices the exhaust gases are first chilled with direct water sprays and thereafter solid contaminants and water soluble substances are removed from the gases by the contacting water. In a spray chamber the water combines with water soluble gases, such as SO$_x$, contained in the gases to form sulphurous and sulphuric acids which are collected with the water spray in a chamber. It is also known as disclosed in U.S. Pat. No. 3,881,004 to recover nitric acid by scrubbing a tail gas with acid or alkaline solution in nitric acids plants which minimize the discharge of nitrogen oxides to the atmosphere.

While heat recovery devices or economizers are well-known, their efficiency needs to be improved because it has been determined that up to 16% of heat escapes unrecovered from the stacks equipped with economizers. This in part can be attributed to emitting the exhaust gas at a relatively high exit temperature. Also, in the case of "mass transfer" heat recovery devices the primary function is to recover heat. Generally the removal of the contaminants from the flue gas stream is incidental. When scrubbing operations are combined with heat removal operations, the process becomes less efficient at heat transfer because a portion of the heat flow is lost in the effort to remove contaminants.

It is generally recognized that wet scrubbers are designed primarily to remove contaminants and are not efficient in recovering waste heat. Heat removal is considered incidental and adds to the expense of the pollution abatement operation. In many instances after wet scrubbing, flue gas must be reheated to rise up and out of the boiler chimneys. As a result boilers equipped with gas scrubbing equipment are expensive to maintain and to operate.

There is need to provide apparatus for removing contaminants from exhaust gases that allows for the efficient use of recovered waste heat. Differently from power generation equipment there are many industrial and commercial contaminating sources which are inherently producing exhaust gases at lower temperature which are not readily adaptable to known prior art devices for waste heat recovery. Therefore there is need for apparatus that allows for the efficient extraction of heat from exhaust gases as they are being treated for the removal of contaminants.

SUMMARY OF THE INVENTION

In accordance with the present invention there is provided a process for combining the recovery of heat from flue gas and removal of contaminants from the flue gas that includes the steps of directing contaminated flue gas at an elevated temperature from an emission stack to an exhaust duct. The contaminated flue gas is conveyed through a series of heat exchangers in the exhaust duct. The temperature of the contaminated flue gas is reduced by flow through the heat exchangers from the elevated temperature to an ambient temperature. The contaminated flue gas at ambient temperature contacts a spray of liquid reagent material. The liquid reagent is passed in contact with the contaminated flue gas at ambient temperature through a bed of material which enhances the absorption of the contaminants and separation from the flue gas. The separated contaminants are collected in solution with the liquid reagent. Thereafter the flue gas is discharged at ambient temperature and substantially free of the contaminants from the exhaust duct.

Further in accordance with the present invention there is provided apparatus for recovering heat from a flue gas and removing the contaminants from the flue gas that includes a duct structure having an inlet for receiving exhaust gases at an elevated temperature and containing contaminants. A plurality of heat exchangers are connected in series to one another in the duct structure. Means for conveying the contaminated exhaust gases through the series connection of heat exchangers progressively removes heat from the exhaust gases and reduces the temperature of the exhaust gases from the elevated temperature to an ambient temperature. Means is provided in the duct structure for spraying the exhaust gases at ambient temperature with a finely divided stream of liquid reagent to combine the contaminants into solution with the reagent. A chamber is connected to the duct structure and includes means for receiving the exhaust gases and contaminants in solution with the reagent. An absorption enhancer contained in the chamber receives the contaminants in solution with the reagent and the exhaust gases and promotes the removal of the contaminants from the exhaust gases and entrance of the contaminants into solution with the liquid reagent. A stack is connected to the chamber for conveying from the duct structure the exhaust gases at ambient temperature and substantially free of the contaminants.

Additionally the present invention includes an absorption chamber having a housing with an inlet for receiving combustion gases containing contaminants and an outlet for discharging the combustion gases. Spray nozzles are positioned in the housing adjacent the inlet. Conduit means supply a flow of liquid reagent to the spray nozzles to introduce the liquid reagent into the housing and mixture with the combustion gases. An absorption enhancer is contained in the housing to receive the mixture of the liquid reagent and combustion gases and promote separation of the contaminants from the combustion gases for formation of a solution of the contaminants and the liquid reagent. Discharge means connected to the outlet removes the combustion gases substantially free of the contaminants from the housing.

Accordingly the principal object of the present invention is to provide method and apparatus for not only recovering waste heat from flue gas emissions, but also efficiently remove the contaminants to allow the flue gas to be emitted substantially free of contaminants to the atmosphere.

Another object of the present invention is to increase the efficiency of the recovery of waste heat from flue gas by reducing the flue gas to an ambient temperature before it is released and to recover contaminants, such as $NO_x$ and $SO_x$, from the flue gas at ambient temperatures.

Another object of the present invention is to increase the efficiency of recovering waste heat from flue gas while removing the contaminants therefrom without requiring heat to be added to the flue gas.

A further object of the present invention is to provide method and apparatus for removing contaminants from boiler flue gas while recovering heat from the flue gas and returning the recovered heat to the boiler while removal of the contaminants from the flue gas takes place at ambient temperatures to increase the efficiency of the scrubbing process and the overall performance of the boiler operation as well as to reduce the corrosive effects on the recovery apparatus.

These and other objects of the present invention will be more completely disclosed and described in the following specification, the accompanying drawings, and the appended claims.

DESCRIPTION OF THE PREFERRED EMBODIMENTS

Figure 1:
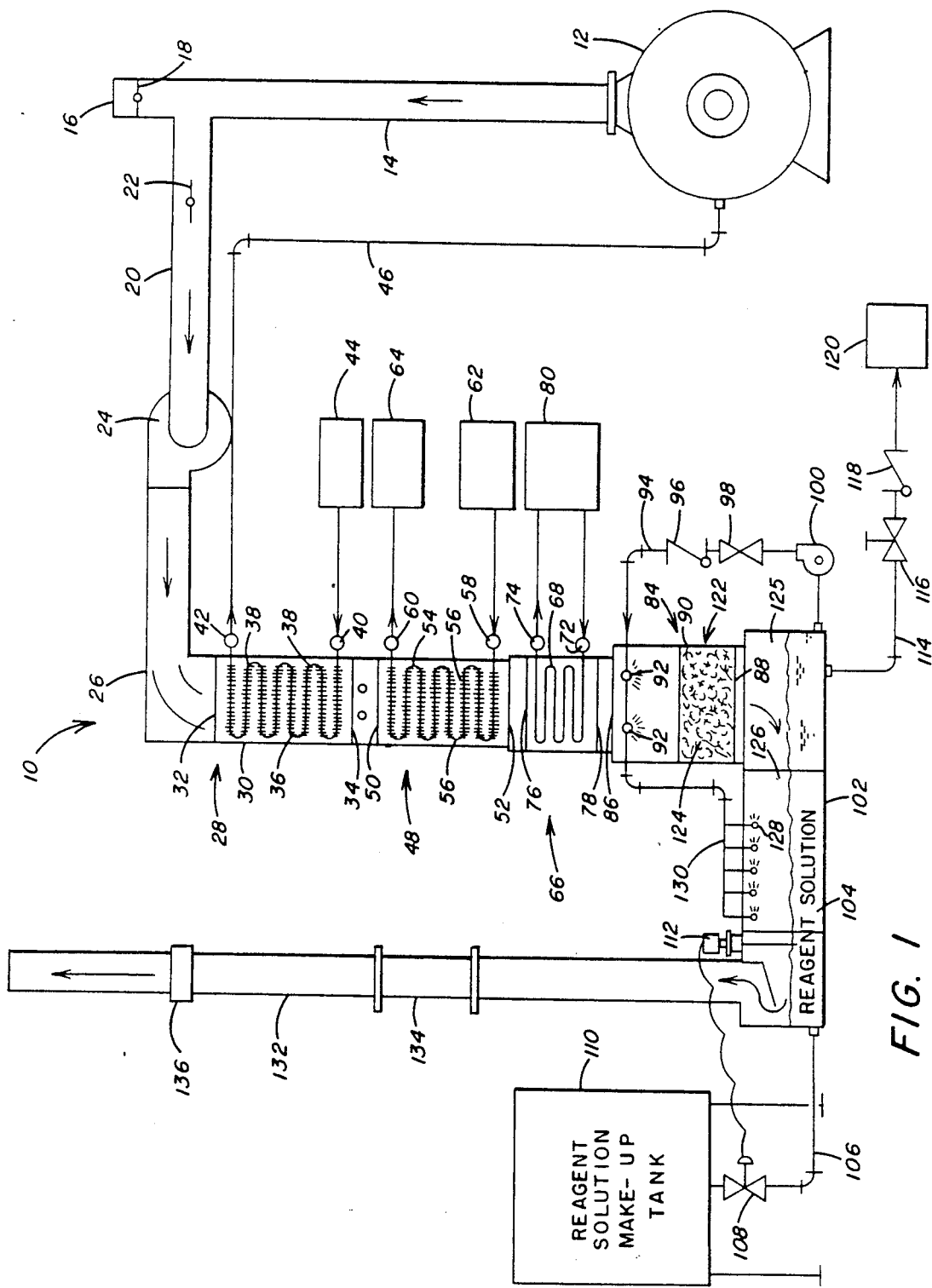
FIG. 1 is a schematic illustration of a process for combining the recovery of waste heat from flue gases and removal of contaminants from the flue gases.

Referring to FIG. 1, there is illustrated waste heat recovery apparatus generally designated by the numeral 10 that is utilized with fired process heaters or fossil fueled boilers, such as a packaged firetube or a watertube boiler. The boiler may be of the type associated with utility power plants or those designed to generate 4 million to 60 million BTU/hr. In one example, as shown in FIG. 1, a boiler 12 having a capacity of, for example, 125 hp to 1000 hp, includes a boiler stack 14 having an outlet 16 controlled by a flue gas damper 18.

In normal operations, the flue gases from the boiler 12 are discharged through the stack 14 from the outlet 16. In the present invention a supply duct 20 is connected to and intersects the stack 14 upstream of the damper 18 which is maintained in a closed position as illustrated in FIG. 1. Positioned within the supply duct 20 adjacent to its connection with the stack 14 is a second damper 22 which serves as a flue gas diverter. The damper 22 is normally maintained open and preferably is connected through a linkage (not shown) to the damper 18 adjacent the stack outlet 16.

Downstream of the damper 22 in the supply duct 20 is an induced draft fan 24. With this arrangement the fan 24 diverts the combustion exhaust gases from the boiler 12 through the stack 14 and into the supply duct 20. The exhaust gases are not emitted from the stack outlet 16. Fan 24 is shown as a fan forcing hot gases from supply duct 20 on through the recovery system. Alternatively fan 24 can be located in the stack at a point following the recovery system where the cooler gas, now substantially free of contaminants, is emitted to the atmosphere.

As indicated above, the present invention is adaptable for use with a wide variety of boilers including utility boilers, major process boilers, liquor recovery boilers as well as smaller fired process and heating boilers In the case of a fired process or heating boiler operating between 125 to 1000 hp for generating 4 million to 60 million BTU/hr., the temperature of the flue gases flowing through the boiler stack 14 is in the range between about 350°-525° F. For flue gases from a utility boiler this temperature range is higher. With the flue gas damper 18 closed, the flue gases are diverted into the supply duct 20 and are conveyed therethrough by the fan 24 downstream through duct system 26. The duct system 26 includes a first heat exchanger generally designated by the numeral 28 which is one of several heat exchangers connected in series to one another in the overall duct system 26.

The heat exchanger 28 is conventional in design and includes a housing 30, having an inlet 32 connected to the duct portion 26 and an outlet 34. Within the housing 30 is positioned a cooling tube 36 extending in a tortious path which may be equipped with cooling fins 38 extending outwardly from the surface of the tube. The tube 36 extends from an inlet 40 of the housing 30 to an outlet 42 thereof. The tube inlet 40 is preferably connected to a deareator tank 44.

Water at a temperature of approximately 220° F. from the deareator tank 44 flows through the tube 36 in the exchanger 28. The heat from the flue gases flowing through the heat exchanger 28 contacts the tube 36 and fins 38 so that the heat from the flue gas is transferred from the fins 38 through the walls of the tube 36. The water in the tube 36 is then heated to approximately 250° F. before it exits the heat exchanger 28 through the outlet 42. From the heat exchanger 28 the heated deareated water is then conveyed through a duct system 46 to the boiler 12. This operation reduces the expense of operating the boiler 12.

In practice of the present invention with larger boilers having greater and more diverse fuel input requirements, the sensible heat recovery unit 28 is increased in size to accommodate greater flue gas volumes. Often an economizer or other flue gas heat recovery unit is already inplace and partially or wholly accomplishes this requirement. Such larger equipment includes megawatt sized utility boilers, major process boilers, liquor recovery boilers, incinerators with or without waste heat recovery boilers or equipment, as well as refinery and chemical process heaters and burners, internal combustion engines and gas turbines or other sources of flue gas exhaust produced form the combustion of fossil fuels. Substantially higher flue gas temperatures are often experienced with these other, alternative sources of contaminated and polluting flue gases. However, these higher flue gas temperatures are accommodated in accordance with the present invention.

From the heat exchanger 28, the flue gases exit through outlet 34 at a temperature of approximately 250° F. reduced from a temperature in the range of 350°–500° F. at the inlet 32. A second heat exchanger, such as a latent heat economizer 48, is connected downstream of the heat exchanger 28 in the duct system 26. The economizer 48 includes an inlet 50 connected by additional duct work to the heat exchanger outlet 34. The economizer 48 also includes an outlet 52 and the same finned tube construction as the heat exchanger 28 where a tube 54, having fins 56, includes an inlet 58 and an outlet 60. The inlet 58 is connected to a make-up water or condensate receiver 62, and the outlet 60 is connected to a condensate receiving tank 64.

With the flue gas entering the economizer inlet 50 at a temperature of about 250° F., heat is transferred therefrom in the economizer 48 to the water in the tube 54. This water is heated in the tube 54 from an inlet temperature in the range 60°–120° F. to a temperature in the range 120°–180° F. when it is conveyed to the tank 64. As a result of the transfer of both latent and sensible heat from the flue gas passing through the economizer 48 to the tube 54, the temperature of the flue gas is reduced to the range 75°–125° F. when it exits the economizer 48.

From the economizer 48 the flue gas, at a temperature in the range 75°–125° F. is directed further downstream through additional duct work to a third heat exchanger generally designated by the numeral 66. The heat exchanger 66 functions as a temperature controller and also includes a tube 68 with an inlet 72 and an outlet 74. In addition, the heat exchanger 66 includes an inlet 76 connected to outlet 52 of the economizer 48 and an outlet 78. The tube 68 is connected at inlet 72 which receives coolant from a recirculating cooling system 80. The tube outlet 74 is also connected to system tank 80 and returns heated coolant back to system tank 80. The coolant from the system 80 enters the heat exchanger 66 at a temperature in the range between 20°–40° F. The coolant is heated in heat exchanger 66 by transfer of latent and sensible heat from the flue gas through the tube 68 to a temperature in the range between about 75°–125° F. when it exits outlet 74 to the tank 80. The flue gas then exits the heat exchanger 66 at ambient temperature, for example at a temperature of approximately 50° F.

Moisture in the flue gas condenses on the surface of the tube 68, and also on fins which may be provided on tube 68 but are not shown in FIG. 1, as the flue gas temperature progressively lowers below the dew point of the flue gas. The presence of the moisture on the tube serves to partially scrub or absorb contaminants in the flue gas, such as $CO_2$, $SO_x$ and $NO_X$ from the flue gas. The condensate is generally acidic and therefore corrosive in nature, particularly at its dew point. The condensate is permitted to pass from the heat exchanger 66 through outlet 78.

Heat exchanger 66 is constructed of corrosive resistant materials and functions to rapidly lower both flue gas and flue gas condensate temperatures to ambient temperature. At ambient temperature the corrosiveness of the flue gas condensate is substantially reduced. Also by controlling the temperature of the flue gas in this manner, the flue gas is prepared to achieve maximum efficiency in the separation of the contaminants from the flue gas, as will be explained later in greater detail.

Most preferably the temperature of the flue gas exiting the heat exchanger or temperature controller 66 is at an ambient temperature of 50° F. At ambient temperature the absorpability of the contaminants in the flue gas with a reagent solution is greatly enhanced, particularly in the absorption of nitrates, sulfates and carbon dioxide. The cooled flue gas exits the heat exchanger 66 at outlet 78 and enters a primary scrubbing chamber generally designated by the numeral 84. The chamber 84 includes an inlet 86 for receiving cooled flue gas from the heat exchanger 66 and an outlet 88.

The chamber 84 has a housing 90 in which is positioned a series of spray nozzles 92 adjacent the inlet 86. The nozzles 92 are connected by a conduit system 94 through a check valve 96 and a gate valve 98 to a pump 100. The pump 100 is connected to a tank 102 containing a reagent solution 104. A reagent suitable for use in removing $NO_x$ contaminants from the flue gas in accordance with the present invention is urea at a concentration between about 32% to 49% by weight in water with suitable additives such as coagulants, surfactants, or coalescents as required to facilitate local waste treatment requirements. As the strength of the reagent solution diminishes, the spent reagent, which for $NO_x$ removal is predominately ammonium nitrate solution, is discharged from tank 102 to a waste water treatment plant 120. The reagent solution is maintained at suitable absorbing strength by controlling replenishment of spent solution so that final emissions levels, as measured by emissions detecting and metering equipment, do not exceed levels permitted by agencies, such as E.P.A., or jurisdictions, such as California's South Coast Air Quality Management District.

The tank 102 is connected by a conduit system 106 through a control valve 108 to a tank 110 containing fresh reagent. The quantity of reagent in the tank 102 is controlled by a level controller 112 electrically connected to the control valve 108. When the level of the reagent solution in the tank 102 falls to a predetermined level, the controller 112 actuates the valve 108 to open to provide a flow of reagent solution from the tank 110 to the tank 102. The valve 108 automatically shuts off when the level of the reagent solution in the tank 102 reaches the predetermined level. In addition, the reagent tank 102 is connected by a conduit system 114 through valve 116 and a check valve 118 to the water treatment plant 120. Valve 116 is suitably actuated, either by hand in response to predetermined indications or automatically by emissions detecting and metering equipment, to drain spent reagent solution 104 to the water treatment plant 120.

As the flue gas enters the scrubbing chamber 84 at a temperature of approximately 50° F., the reagent solution from the tank 102 is sprayed from nozzles 92 into contact with the low temperature flue gas stream. Most preferably the nozzles 92 generate a mist-like spray of reagent solution. In one example, the nozzles generate a reagent spray where droplets are formed having a particle size as low as 10 microns. A spray with droplets of this size is preferred as it increases the surface contact of the flue gas with the reagent solution. By subjecting the flue gas to an atomized reagent spray, the absorpability of the contaminants in the flue gas with the reagent is substantially increased.

To further increase the contact of the contaminants with the reagent solution, the flue gas and spray of reagent are directed into an absorption enhancer chamber generally designated by the numeral 122. In one embodiment the absorption enhancer 122 is a batting 124, as shown in FIG. 1, of fibrous material. The fibers of the batting 124 are intimately dispersed to form a composite extended surface on which the reagent spray and flue gas collect. The structure of the batting 124 facilitates or promotes the contact of the reagent spray with the contaminants contained in the flue gas. Also the period of time that the reagent is in contact with the flue gas is enhanced by the extended surface area provided by the batting structure.

In one example, the fibers are a ribbon-like material which are intimately admixed and mechanically interlocked to form the batting 124. The batting 124 in the chamber 122 promotes the absorption of the contaminants in the flue gas by providing additional wetted surface area. Thus, the total surface area of the fibrous batting maximizes exposure of reagent to the contaminants in the flue gas. The absorption is also enhanced by the fact that the flue gas is at an optimum temperature, which is ambient temperature, when subjected to the reagent spray and passed through the absorption enhancer chamber 122.

The flue gas, all moisture condensed from the flue gas, and reagent solution containing the contaminants which have combined with the reagent pass from the scrubbing chamber 84 through the chamber 122 and into inlet portion 125 of tank 102. The reagent solution in the tank 102 is constantly being recirculated and the level is maintained with solution from the tank 110. The atomized spray from nozzles 128 further removes the contaminants remaining in the low temperature flue gas and introduces the contaminants into solution with the reagent in the tank 102. Periodically the spent reagent containing the contaminants is withdrawn and is safely conveyed therefrom to a water treatment plant 120 where ammonium nitrate can be extracted as a by-product in the case where $NO_x$ contaminants are absorbed in chemical combination with urea.

Figure 2:
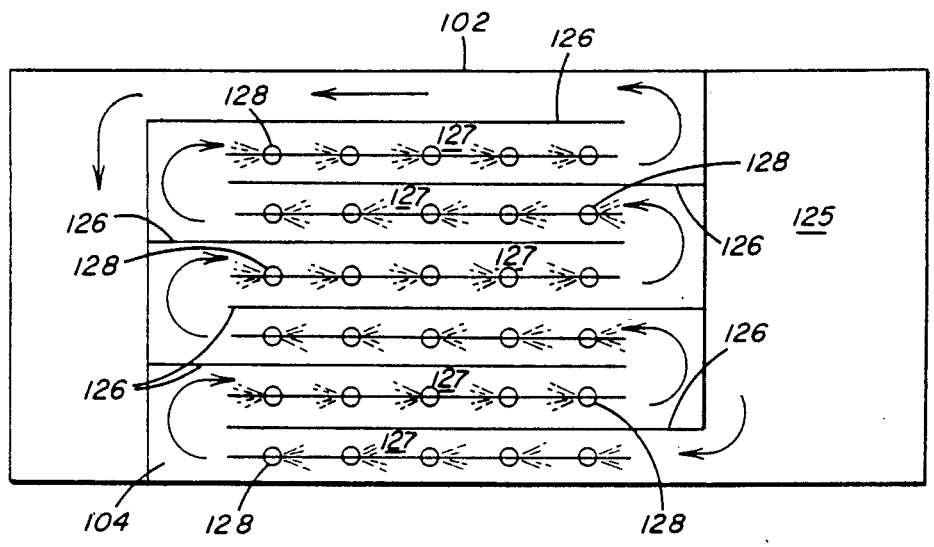
FIG. 2 is a schematic top plan view of a contaminant removal tank used in the process shown in FIG. 1.

The tank 102 as shown in FIG. 2 includes a plurality of parallel spaced apart partitions 126 positioned in the tank 102 to provide a serpentine-like path for directing the flue gas in an extended flow path through the tank 102 above the level of the reagent solution in the tank 102. The partitions 126 form duct-like conduits or channels 127 that interconnect at their end points. A bank of spray nozzles 128 is positioned above each conduit 127 in tank 102. The serpentine flow path of the flue gas, as indicated by the arrows in FIG. 2, permits extended contact of the reagent with the flue gas within the confined dimensions of the tank 102. The nozzles 128 correspond to the nozzles 92 used in the chamber 84 described above.

The bank of nozzles 128 are positioned in each conduit 127 to direct a stream of reagent droplets oppositely to the direction of flow of the flue gas as it winds in a serpentine path through the tank 102 above the level of the reagent 104. The serpentine path is facilitated by the partitions 126 extending from the top of the tank 102 down into the reagent solution to a position raised above the bottom of the tank. This construction allows free circulation of the reagent solution 104 in tank 102 while presenting an area of duct cross section above the solution level in tank 102. The duct cross section is varied by raising or lowering the level of the reagent solution 104 in tank 102. By varying the duct cross section formed by adjacently spaced apart partitions 126, the top of the tank 102, and the surface of the reagent solution 104, the flow rate of the flue gas through the ducts or channels is controlled. Control of the flue gas flow rate permits selection of optimum contact time and velocity of the reagent spray with the flue gas.

Removal of $SO_x$ contaminants from flue gas will be partially facilitated by contact with the water component of reagent solution 104. In many practical cases this degree of $SO_x$ removal may be adequate. In a case where air quality standards require more complete removal of $SO_2$, additional chemicals, specifically intended to combine with $SO_2$ may be introduced to reagent solution make-up tank 110. This additional chemical make-up of reagent solution 104 may be expected to become spent just as does typical $NO_x$ removal chemical. Specific measure of $SO_2$ emissions from stack 132 will be required to control replenishment of $SO_x$ absorbant chemicals. Waste water treatment plant 120 will require specific procedures to separate the $SO_x$ contaminants separate from the more benign ammonium nitrate typically expected with $NO_x$ removal.

If typical lime or calcium hydroxide $SO_x$ removal scrubbing is required, then additional slurry supply tanks, pumps and separate spray nozzles are used in the spray nozzle areas. Slurry collection sumps are installed in tank 102 to additionally collect calcium sulfate type residues.

Removal of fuel ash particulates from flue gas will be almost totally facilitated by scrubbing contact with the liquid reagent solution 104. In a case where more complete particulate removal is required by emissions permit levels additional scrubbing by conventional means in stack 132 will be required.

Figure 3:
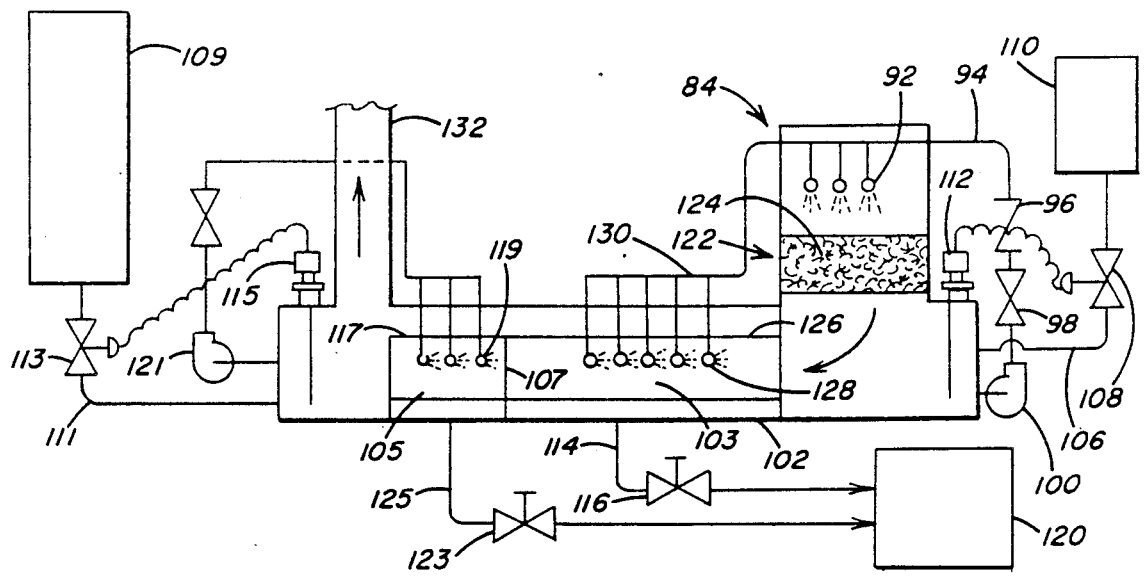
FIG. 3 is a schematic illustration of another embodiment of the contaminant removal tank.

Now referring to FIG. 3, there is illustrated another embodiment of the containment removal tank 102 adapted for use in separating both $NO_x$ and $SO_x$ contaminants from the flue gas. Like numerals shown in FIG. 3 designate like parts described above and identified in FIGS. 1 and 2. The flue gas at ambient temperature exits the chamber 122 and enters the tank 102, which in the embodiment in FIG. 3 includes a first portion 103 and a second portion 105. The first portion 103 includes the urea reagent for the removal of $NO_x$ contaminants, and second tank portion 105 includes a calcium hydroxide solution for removing $SO_x$ contaminants. A partition 107 divides the tank portions 103 and 105.

The tank portion 103 contains the reagent solution above identified and supplied from tank 110. The flue gas is subjected to the reagent spray from the bank of nozzles 128 positioned in the tank portion 103 to remove the $NO_x$ contaminants from the flue gas. It should be understood that both tank portions 103 and 105 include the same partitioned structure described above in reference to the tank shown in FIGS. 1 and 2 for generating a serpentine-like flow of the flue gas through the tank 102 over the surface of the solutions in the tank.

From the tank portion 103 the flue gas substantially free of $NO_x$ contaminants but still containing $SO_x$ contaminants enters the tank portion 105, which is connected to a source 109 of calcium hydroxide. The source or tank 109 is connected by a conduit system 111 through a gate valve 113 to tank portion 105. The quantity of calcium hydroxide supplied to tank portion 105 is electrically controlled by level controller 115 in a manner similar to controller 112 used for tank portion 103. When the level of solution in tank portion 103 falls to a predetermined level, controller 115 actuates valve 113 to allow flow of the solution from the tank 109 into the tank portion 105. Valve 113 automatically shuts off when the level of the solution in tank portion 105 reaches the predetermined level.

The tank portion 105 includes a plurality of parallel spaced partitions 117 which generate the serpentine flow of flue gas in the tank portion 105 over the calcium hydroxide solution. Once the flue gas flows through the conduits 127 formed by the partitions 126 in the tank 103, the flue gas flow enters the tank portion 105 and follows a serpentine flow path through the conduits formed in the tank portion 105 by the partitions 117. The bank of nozzles 119 directs a spray of calcium hydroxide into the flue gas as it flows through the conduits around the partitions. The direction of spray of the calcium hydroxide in the tank portion 105 is opposed to the direction of flow of the flue gas. This assures maximum contact of the calcium hydroxide spray droplets with the flue gas. As a result, the $SO_x$ contaminants in the flue gas are absorbed by the calcium hydroxide and are separated out of the flue gas and enter into solution with the liquid in the tank portion 105.

The calcium hydroxide solution in the tank portion 105 is conveyed therefrom by pump 121 to the banks of nozzles 119 positioned over each of the conduits formed by the parallel spaced partitions 117. As with the reagent solution in the tank portion 103, the calcium hydroxide solution in tank portion 105 is constantly being recirculated. Also, periodically the spent calcium hydroxide solution containing calcium sulfate-type residue is withdrawn from tank portion 105 and conveyed through valve 123 into conduit system 125 to the water treatment plant 120.

The flue gas exits the tank 102 substantially free of contaminants and enters a stack 132 connected to the tank outlet. A moisture separator 134 positioned in the stack 132 removes any moisture that may remain in the flue gas. Metering equipment 136 in the stack 132 monitors the flue gas to determine whether the content of the flue gas in the stack 132 meets the required state and federal standards. If the standards are exceeded, then the metering equipment 136 actuates the valves 108 and 113 shown in FIG. 3 to replenish the spent solution from the tank portions 103 and 105 and restore the solution to a suitable absorbing strength. Simultaneously the valves 116 and 123 are opened to discharge the spent solution from the tank portions 103 and 105 and allow it to be replaced by solution having the desired absorpability for $NO_x$ and $SO_x$ contaminants.

With the above engagement the flue gas is emitted from the stack 132 into the atmosphere as an emission that meets the air quality standards established by such public agencies as the E.P.A. or California's South Coast Air Quality Management District. The flue gas is emitted at a relatively low temperature due to the recovery of heat improving the total boiler efficiency. Not only is boiler efficiency enhanced by a maximum recovery of heat from the flue gas but by reducing the flue gas to ambient temperature, the soluability of the contaminants with the reagent solution is substantially increased.

According to the provisions of the patent statutes, we have explained the principle, preferred construction and mode of operation of our invention and have illustrated and described what we now consider to represent its best embodiments. However, it should be understood that, within the scope of the appended claims, the invention may be practiced otherwise than as specifically illustrated and described.

We claim:

1. An apparatus for recovering heat from flue gas and removing the contaminants from the flue gas comprising,
    a duct structure having an inlet for receiving exhaust gases at an elevated temperature and containing contaminants,
    a plurality of heat exchangers connected in series to one another in said duct structure,
    means for conveying the contaminated exhaust gases through the series connection of said heat exchangers to progressively remove heat from the exhaust gases and reduce the temperature of the exhaust gases,
    a temperature controller having a coolant circulating therethrough for receiving the exhaust gases and being heated by the exhaust gases to transfer heat from the exhaust gases to the coolant and reduce the temperature of the exhaust gases from an elevated temperature to an ambient temperature,
    means positioned in the duct structure for spraying the exhaust gases at ambient temperature with a finely divided stream of liquid reagent to combine the contaminants in solution with the reagent,
    a chamber connected to said duct structure and including means for receiving the exhaust gases and contaminants in solution with the reagent,
    an absorption enhancer contained in said chamber for receiving the contaminants in solution with the reagent and the exhaust gases to promote removal of the contaminants from the exhaust gases and entrance of the contaminants into solution with the liquid reagent, and
    a stack connected to said chamber means for conveying from said duct structure the exhaust gases at ambient temperature and substantially free of the contaminants.

2. The apparatus as set forth in claim 1 which includes,
    a recirculating cooling system for progressively removing latent and sensible heat from the exhaust gases as the temperature of the gases is reduced from an elevated temperature to an ambient temperature,
    said coolant flowing through said recirculating system for receiving the heat from the exhaust gases, and
    means for transporting the heated fluid from said recirculating system.

3. The apparatus as set forth in claim 1 which includes,
    means for circulating coolant at a temperature in the range between 20°-40° F. into thermal contact with the exhaust gases to absorb heat from the exhaust gases and raise the temperature of the coolant to preselected temperatures and progressively reduce the temperature of the exhaust gases to an ambient temperature of 50° F.

4. The apparatus as set forth in claim 1 in which,
    said absorption enhancer includes an extended surface for receiving the exhaust gases and the liquid reagent to promote the absorption of the contaminants in the exhaust gases into solution with the reagent liquid, and
    collection means for receiving and conveying away from the flue gas the contaminants absorbed in the reagent liquid.

5. The apparatus as set forth in claim 1 which includes, a collection tank including an inlet for receiving the exhaust gases from said chamber and an outlet, said tank being partitioned to form an extended passageway for the flow of the exhaust gases through said tank, means for injecting a contaminant absorbing fluid into the flow of the exhaust gases through said tank, and means for collecting and removing from said tank the contaminants absorbed into solution with the contaminant absorbing fluid with said exhaust gases substantially free of contaminants being directed from said tank through said outlet.

6. An apparatus for removing contaminants from the exhaust gases of a combustion process comprising, a vessel having an inlet for receiving exhaust gases containing contaminants and an outlet for emitting the exhaust gases, a source of reagent solution, means for supplying the reagent solution to said vessel to maintain a preselected level of reagent solution in said vessel, means for partitioning the interior of said vessel between said inlet and said outlet to form a serpentine path of interconnected channels for the flow of exhaust gases through said vessel from said inlet to said outlet above the surface of the reagent solution, means for adjusting the level of reagent solution in said vessel to vary the cross sectional area of said channels and control the flow rate of the exhaust gases through said channels, and means positioned in said vessel and connected to said source of reagent solution for subjecting the flow of exhaust gases through said vessel to a spray of reagent solution as the exhaust gases follow said serpentine path through said vessel to combine the contaminants in solution with the reagent so that the exhaust gases exit said vessel at said outlet substantially free of contaminants.

7. The apparatus as set forth in claim 6 which includes, a first set of spray nozzles connected to said source of reagent solution for directing a reagent spray into contact with and oppositely of the flow of exhaust gases through said vessel.

8. The apparatus as set forth in claim 7 which includes, a second set of spray nozzles connected to an absorption solution for removing $SO_x$ contaminants from the exhaust gases, said second set of spray nozzles positioned in said vessel to direct a spray of absorption solution into contact with and oppositely of the direction of flow of exhaust gases through said vessel, and means for removing from said vessel the $SO_x$ contaminants absorbed into the absorption solution.

9. The apparatus as set forth in claim 6 which includes, metering means for monitoring the content of the exhaust gases to determine if an undesirable level of contaminants remain in the exhaust gases exiting said vessel, and valve means for controlling the supply of reagent solution to said vessel such that in the event an undesirable level of contaminants in the exhaust gases exiting said vessel is detected said valve means is actuated to supply additional reagent solution to said vessel to increase the contaminant absorbing strength of the reagent solution.

* * * * *